US011456533B1

(12) United States Patent
Liang et al.

(10) Patent No.: US 11,456,533 B1
(45) Date of Patent: Sep. 27, 2022

(54) ANTENNA STRUCTURE AND ELECTRONIC DEVICE

(71) Applicant: BEIJING XIAOMI MOBILE SOFTWARE CO., LTD., Beijing (CN)

(72) Inventors: Peiyu Liang, Beijing (CN); Tao Jiao, Beijing (CN); Ge Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/360,445

(22) Filed: Jun. 28, 2021

(30) Foreign Application Priority Data

Mar. 17, 2021 (CN) .......................... 202110287597.2

(51) Int. Cl.
*H01Q 1/48* (2006.01)
*H01Q 5/371* (2015.01)
*H04M 1/02* (2006.01)
*H01Q 1/24* (2006.01)

(52) U.S. Cl.
CPC ............. *H01Q 5/371* (2015.01); *H01Q 1/243* (2013.01); *H01Q 1/48* (2013.01); *H04M 1/0274* (2013.01)

(58) Field of Classification Search
CPC ............ H01Q 5/371; H01Q 1/24; H01Q 1/48; H04M 1/02
See application file for complete search history.

(56) References Cited

U.S. PATENT DOCUMENTS 7,602,341 B2 * 10/2009 Wei-Shan ............ H01Q 1/2258
343/702
2014/0347227 A1 * 11/2014 Iellici ...................... H01Q 5/40
343/702

OTHER PUBLICATIONS

European Patent Application No. 21182678.9 extended Search and Opinion dated Jan. 4, 2022, 9 pages.

* cited by examiner

*Primary Examiner* — Andrea Lindgren Baltzell
(74) *Attorney, Agent, or Firm* — Lathrop GPM LLP

(57) ABSTRACT

An antenna structure and an electronic device using the antenna structure are disclosed. The antenna structure includes: a feed point; and a metal frame. The metal frame includes a body, a radiator and a coupling branch. The radiator and the coupling branch are connected to the body, and enclose, together with the body, a clearance area. A first end of the radiator away from the body and an end of the coupling branch away from the body form an antenna gap connected to the clearance area. The radiator is connected to the feed point and includes a through groove and an opening, the through groove runs along a height direction of the radiator, and the opening is connected to the through groove along a thickness direction of the radiator. A junction of the feed point and the radiator and the opening are located at both sides of the through groove.

20 Claims, 4 Drawing Sheets

○ 0 (0.0667, 2.19e-06) ohm
● 6 (36.7, 68.5) ohm

1、2.056155 (488.152092, -15.017071) ohm;
2、3.075333 (12.123856, -0.045632) ohm;
3、4.055141 (101.858415, -1.417967) ohm;
4、4.576993 (33.588444, -0.070998) ohm。

ANTENNA STRUCTURE AND ELECTRONIC DEVICE

CROSS-REFERENCE TO RELATED APPLICATIONS

This application is based upon and claims priority to Chinese Patent Application Serial No. 202110287597.2, filed on Mar. 17, 2021, the entire contents of which are incorporated herein by reference for all purposes.

TECHNICAL FIELD

The present disclosure relates to the technical field of terminals, and more particularly to an antenna structure and an electronic device using a wireless communication technology.

BACKGROUND

At present, for the fifth-generation (5G) mobile communication technology, mainstream 5G communication frequency bands on the market include the N41 frequency band, N77 frequency band, N78 frequency band and N79 frequency band. Among these bands, the N41 frequency band, N78 frequency band and N79 frequency band are mainly used in China, and the N77 frequency band may be used abroad. Consequently, mainstream mobile phones on the market support the N41 frequency band, N78 frequency band and N79 frequency band, but cannot implement 5G communication overseas, which limits the application of electronic devices.

SUMMARY

The present disclosure provides an antenna structure and an electronic device, to solve the shortcomings in the related art.

According to a first aspect of embodiments of the present disclosure, an antenna structure is provided. The antenna structure includes: a feed point; and a metal frame. The metal frame includes a body, a radiator and a coupling branch. The radiator and the coupling branch are both connected to the body, and enclose, together with the body, a clearance area. A first end of the radiator away from the body and an end of the coupling branch away from the body cooperate to form an antenna gap, and the antenna gap is connected to the clearance area. The radiator is connected to the feed point. The radiator includes a through groove and an opening, the through groove runs through the radiator along a height direction of the radiator, and the opening is connected to the through groove along a thickness direction of the radiator. A junction of the feed point and the radiator and the opening are located at both sides of the through groove.

According to a second aspect of embodiments of the present disclosure, an electronic device is provided. The electronic device includes: a mainboard; and an antenna structure. The antenna structure includes a feed point arranged at the mainboard; and a metal frame. The metal frame includes a body, a radiator and a coupling branch. The radiator and the coupling branch are both connected to the body, and enclose, together with the body, a clearance area. A first end of the radiator away from the body and an end of the coupling branch away from the body cooperate to form an antenna gap, and the antenna gap is connected to the clearance area. The radiator is connected to the feed point. The radiator includes a through groove and an opening, the through groove runs through the radiator along a height direction of the radiator, and the opening is connected to the through groove along a thickness direction of the radiator. A junction of the feed point and the radiator and the opening are located at both sides of the through groove.

It should be understood that the above general description and the following detailed description are only exemplary and explanatory and do not limit the present disclosure.

BRIEF DESCRIPTION OF THE DRAWINGS

The accompanying drawings incorporated into the specification and forming part of the specification, illustrate embodiments in accordance with the present disclosure, and are used with the specification to explain the principles of the present disclosure.

DETAILED DESCRIPTION

Figure 1:
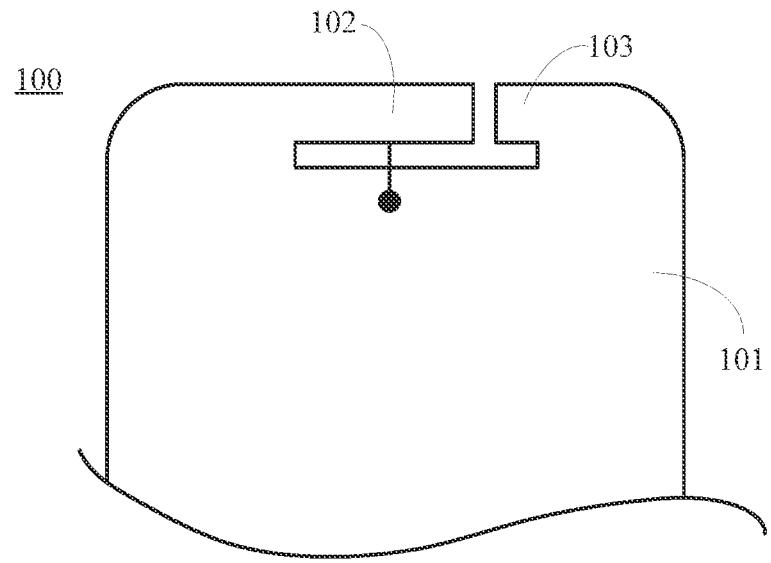
FIG. 1 is a schematic diagram of an antenna structure in the related art.

Exemplary embodiments will be described in detail, and examples of the embodiments will be shown in the drawings. When the following description relates to the drawings, the same numbers in different drawings represent the same or similar elements unless otherwise indicated. The implementations described in the following exemplary embodiments do not represent all implementations consistent with the present disclosure. Instead, they are only examples of devices and methods consistent with some aspects of the present disclosure as detailed in the appended claims.

Terms used in the present disclosure are only for the purpose of describing specific embodiments, and are not intended to limit the present disclosure. As used in the specification and the appended claims, "a/an," "said" and "the" in singular forms are also intended to include plural forms, unless otherwise clearly indicated in the context. It should also be understood that the term "and/or" used herein represents and includes any and all possible combinations of one or more associated listed items.

It should be understood that although terms such as "first," "second," and "third" may be used to describe various kinds of information in the present disclosure, such information shall not be limited by these terms. These terms are only used to distinguish information of the same type from each other. For example, without departing from the scope of the present disclosure, the first information may also be referred to as the second information, and similarly, the second information may also be referred to as the first information. Depending on the context, the term "if" used here may be interpreted as "when" or "upon" or "in response to determining."

FIG. 1 is a schematic diagram of an antenna structure 100 in the related art. The antenna structure is a three-in-one antenna covering the N41 frequency band, N78 frequency band, and N79 frequency band. The antenna structure 100 may include an antenna body 101, an antenna 102 and a coupling unit 103. The antenna 102 and the coupling unit 103 are both connected to the antenna body 101. The antenna body 101, the antenna 102 and the coupling unit 103 together enclose a clearance area of the antenna structure 100. However, due to the arrangement of the antenna structure 100 in FIG. 1, the antenna structure 100 can only cover the N41 frequency band, N78 frequency band and N79 frequency band, which limits the application of electronic devices equipped with the antenna structure 100.

In order to broaden the frequency band coverage of the antenna structure 100, the antenna structure 100 in the related art may be equipped with an impedance matching circuit or a tuning switch in an attempt to make the antenna structure 100 cover the N77 frequency band, which leads to complex circuitry of the antenna structure 100, and causes difficulty in covering the N77 frequency band and N78 frequency band simultaneously in practice due to the limited bandwidth of the antenna 102.

Figure 2:
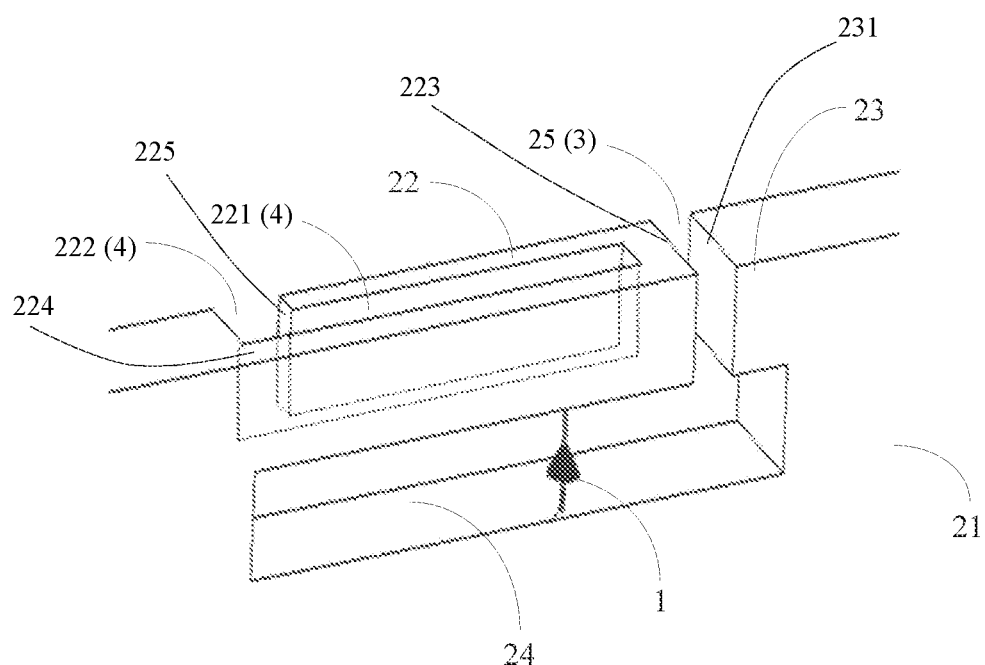
FIG. 2 is a perspective schematic diagram of an antenna structure according to an exemplary embodiment.
Figure 3:
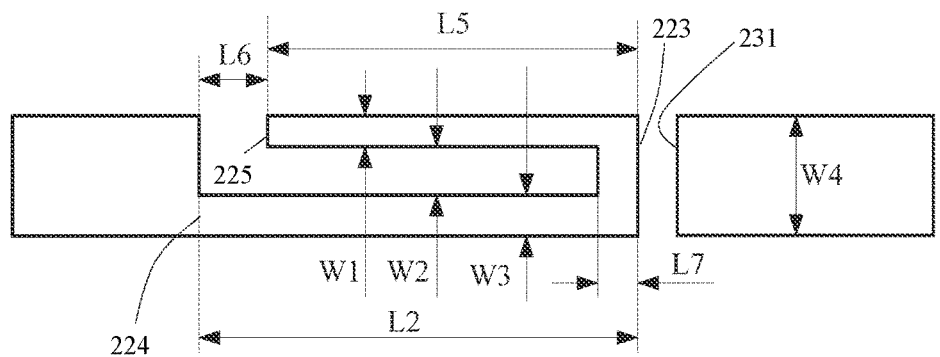
FIG. 3 is a top view of the antenna structure in FIG. 2.
Figure 4:
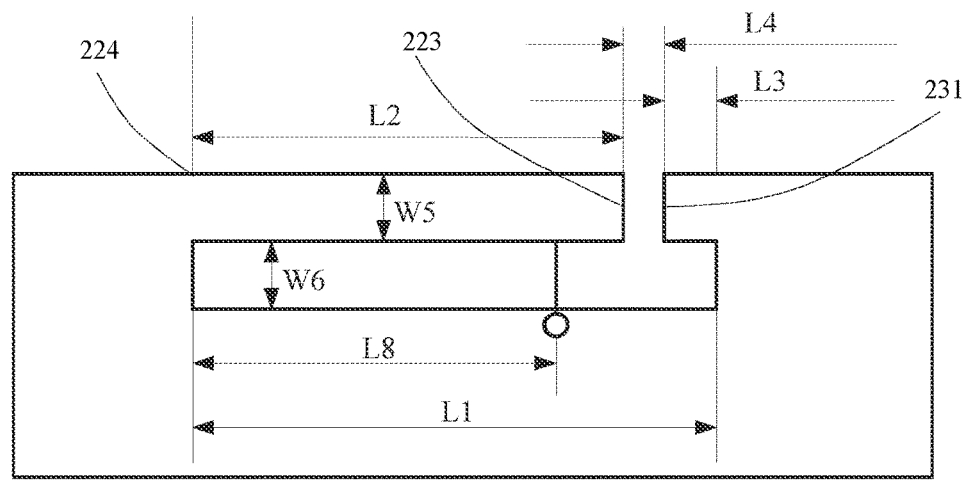
FIG. 4 is a front view of the antenna structure in FIG. 2.

Accordingly, the present disclosure proposes a technical solution. FIG. 2 is a perspective schematic diagram of an antenna structure according to an exemplary embodiment; FIG. 3 is a top view of the antenna structure in FIG. 2; FIG. 4 is a front view of the antenna structure in FIG. 2. As shown in FIGS. 2-4, the antenna structure 200 may include a feed point 1 and a metal frame 2; the metal frame 2 may include a body 21, a radiator 22 and a coupling branch 23; the radiator 22 and the coupling branch 23 are both connected to the body 21; and the radiator 22, the coupling branch 23 and the body 21 may enclose a clearance area 24. An antenna gap 25 is formed between a first end 223 of the radiator 22 away from the body 21 and an end 231 of the coupling branch 23 away from the body 21, to ensure that the antenna structure 200 may transmit an antenna signal outward. The radiator 22 may include a through groove 221 and an opening 222; the through groove 221 may run through the radiator 22 along a height direction of the radiator 22; and the opening 222 may be connected to the through groove 221 along a thickness direction of the radiator 22. The feed point 1 is connected to the radiator 22, and a junction where the feed point 1 and the radiator 22 are connected and the opening 222 are located at both sides of the through groove 221, so that a signal fed from the feed point 1 may be transmitted from the junction of the feed point 1 and the radiator 22, around the through groove 221, to a third end 225 of the radiator 22 for forming the opening 222, and the antenna structure 200 can form a C-shaped radiator. Various portions of the antenna structure 200 are reasonably dimensioned to allow the antenna structure 200 to completely cover 5G frequency bands. Specifically, the antenna structure 200 may cover the N41 frequency band (2496 MHz to 2690 MHz), N77 frequency band (3300 MHz to 4200 MHz), N78 frequency band (3300 MHz to 3800 MHz), and N79 frequency band (4400 MHz to 5000 MHz).

Figure 5:
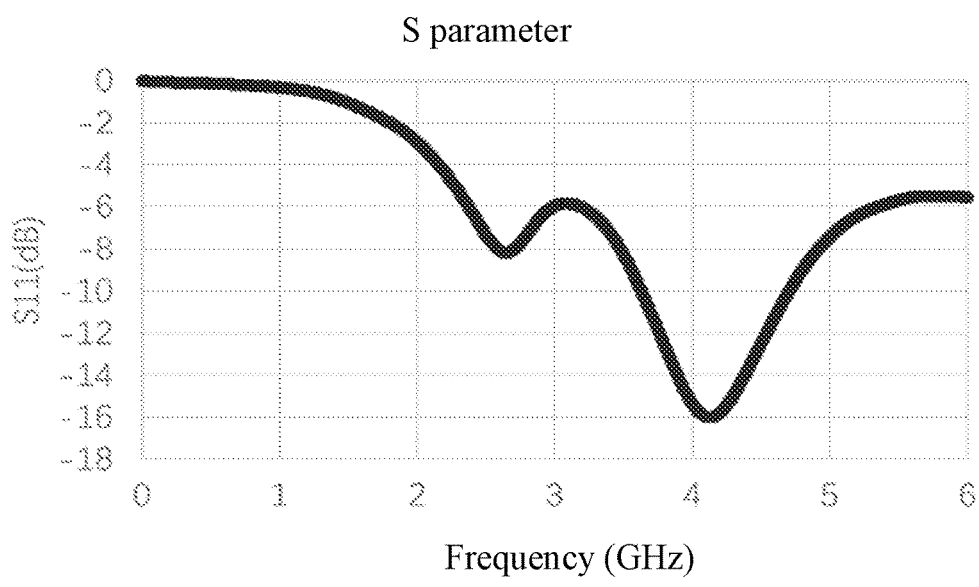
FIG. 5 is a graph illustrating antenna performance of an antenna structure according to an exemplary embodiment.
Figure 6:
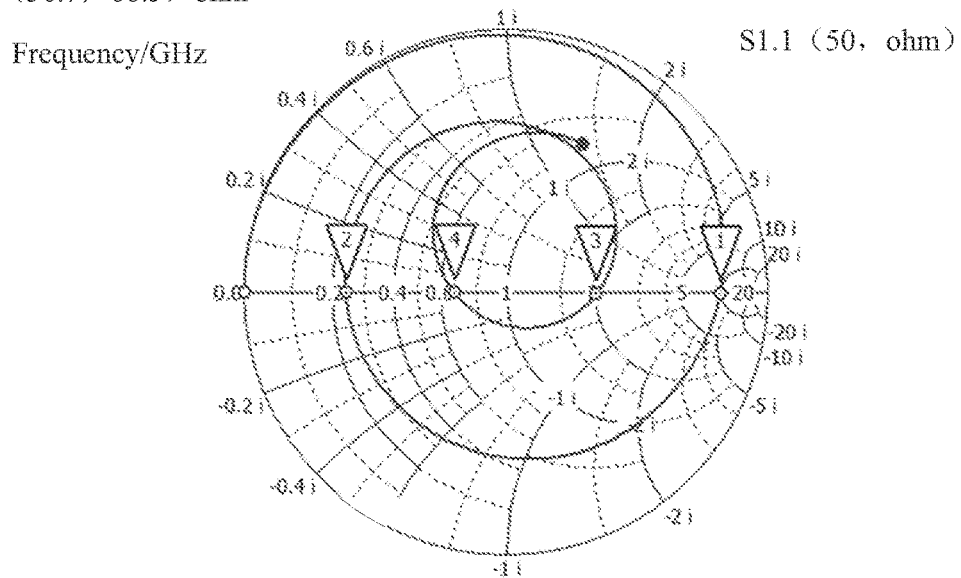
FIG. 6 is a Smith chart of an antenna structure according to an exemplary embodiment.

For example, in a case of L1=18 mm, L2=15 mm, L3=2 mm, L4=1.5 mm, L5=13 mm, L6=2.3 mm, L7=2 mm, L8=11 mm, W1=2 mm, W2=2 mm, W3=2 mm, W4=6 mm, W5=2 mm, and W6=2 mm, a graph illustrating antenna performance as shown in FIG. 5 and a Smith chart as shown in FIG. 6 may be obtained by simulation of the antenna structure 200. As shown in FIG. 5 and FIG. 6, the abscissa of the antenna performance graph represents frequency, and the ordinate represents return loss. The resonance of the antenna structure 200 on the left of FIG. 5 may cover the N41 frequency band, and the resonance of the antenna structure 200 on the right of FIG. 5 may cover the N77 frequency band, N78 frequency band, and N79 frequency band. As shown in FIG. 6, with an impedance to be matched of 50 ohms, the antenna structure 200 may be constructed with four resonances to form a broadband antenna, in which a first resonance has a center frequency of 2.05 GHZ, a second resonance has a center frequency of 3.07 GHZ, a third resonance has a center frequency of 4.05 GHZ, and a fourth resonance has a center frequency of 4.57 GHZ. Among them, the center frequency of the third resonance and the center frequency of the fourth resonance are close to the origin, and better impedance matching can be realized for the N77 frequency band and N79 frequency band.

It can be seen from the above embodiment that in the technical solution of the present disclosure, the C-shaped radiator 22 can be constructed by arranging the through groove and the opening in the radiator 22, and the resonances of the antenna structure 200 can be constructed to cover the N41 frequency band, N77 frequency band, N78 frequency band and N79 frequency band in 5G frequency bands by using a shape change of the radiator 22. Compared with the scheme in the related art that utilizes aperture tuning to realize the frequency band coverage, the circuitry of the antenna structure 200 may be simplified, which facilitates miniaturization of the antenna structure 200.

In order to reach an optimal resonant frequency of the antenna structure 200 and realize the miniaturization of the antenna structure 200 simultaneously, lengths and widths of various portions of the antenna structure 200 may be defined. A sum of respective lengths of the radiator 22, the antenna gap 25 and the coupling branch 23 is greater than or equal to 17 mm and less than or equal to 19 mm, i.e., 17 mm≤L1≤19 mm. Compared with the scheme in the related art as shown in FIG. 1, in which the antenna 102 alone has a length of about 25 mm, and the antenna structure 100 has an overall length exceeding 25 mm, the present disclosure realizes the miniaturization of the antenna structure 200, improving an internal layout of an electronic device having the antenna structure 200.

Many ranges of dimensions are contemplated. For example, a part of the radiator 22 connected to the feed point 1 has a length of greater than or equal to 14 mm and less than or equal to 16 mm, i.e., 14 mm≤L2≤6 mm; the coupling branch 23 has a length of greater than or equal to 1.5 mm and less than or equal to 2.5 mm, i.e., 1.5 mm≤L3≤2.5 mm; the antenna gap 25 has a length of greater than or equal to 1 mm and less than or equal to 1.8 mm, i.e., 1 mm≤L4≤1.8 mm, and L1=L2+L3+L4; a part of the radiator 22 located on a side of the through groove 221 away from the feed point 1 has a length of greater than or equal to 12.5 mm and less than or equal to 13.5 mm, i.e., 12.5 mm≤L5≤13.5 mm; the opening 222 may have a length of greater than or equal to 2 mm and less than or equal to 3 mm, i.e., 2 mm≤L6≤3 mm, and L2=L5+L6; an interval between the through groove 221 and the antenna gap 25 has a length of greater than or equal to 2 mm and less than or equal to 3 mm, i.e., 3 mm; a distance from a second end 224 of the radiator 22 connected with the body 21 to the feed point 1 is greater than or equal to 10.5 mm and less than or equal to 11.5 mm, i.e., 10.5 mm≤L8≤11.5 mm.

Accordingly, thicknesses and heights of some portions in the antenna structure 200 may also be defined to achieve the optimal resonance frequency. For example, the part of the radiator 22 located on the side of the through groove 221 away from the feed point 1 has a thickness of greater than or equal to 2 mm and less than or equal to 3 mm, i.e., 2 mm 3 mm; in the thickness direction of the radiator 22, the through groove 221 has a dimension of greater than or equal to 2 mm and less than or equal to 3 mm, i.e., 2 mm≤W2≤3 mm; the part of the radiator 22 connected to the feed point 1 has a thickness of greater than or equal to 2 mm and less than or equal to 3 mm, i.e., 2 mm≤W3≤3 mm; the coupling branch 23 has a thickness of greater than or equal to 6 mm and less than or equal to 8 mm, i.e., 6 mm≤W4≤8 mm, and W4=W1+W2+W3; the part of the radiator 22 located on the side of the through groove 221 away from the feed point 1 has a height of greater than or equal to 2 mm and less than or equal to 3 mm, i.e., 2 mm≤W5≤3 mm; the clearance area 24 has a height of greater than or equal to 3 mm and less than or equal to 5 mm, i.e., 3 mm≤W6≤5 mm.

The antenna structure 200 may also include a first medium unit 3 and a second medium unit 4. The first medium unit 3 may be arranged in the antenna gap 25, and the second medium unit 4 may be arranged in the through groove 221 and the opening 222, to prevent dust from falling into the electronic device configured with the antenna structure 200. According to media conditions of the first medium unit 3 and the second medium unit 4, the above dimensions of the antenna structure 200 may be finely adjusted.

Figure 7:
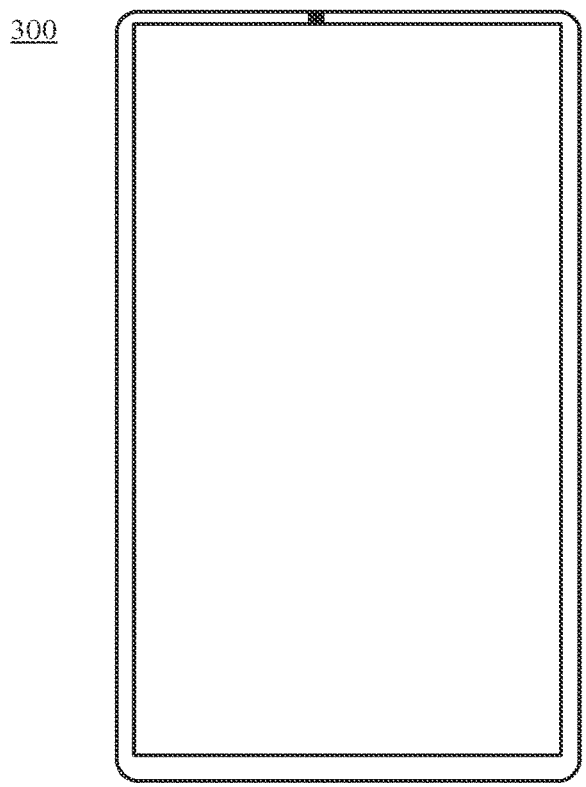
FIG. 7 is a schematic diagram of an electronic device according to an exemplary embodiment.
Figure 8:
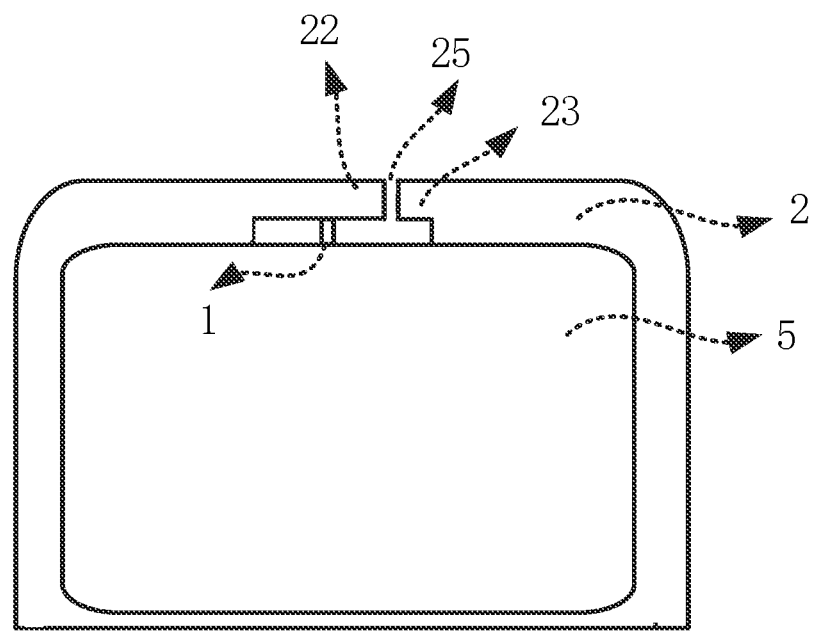
FIG. 8 is a front view of the electronic device shown in FIG. 7.
Figure 9:
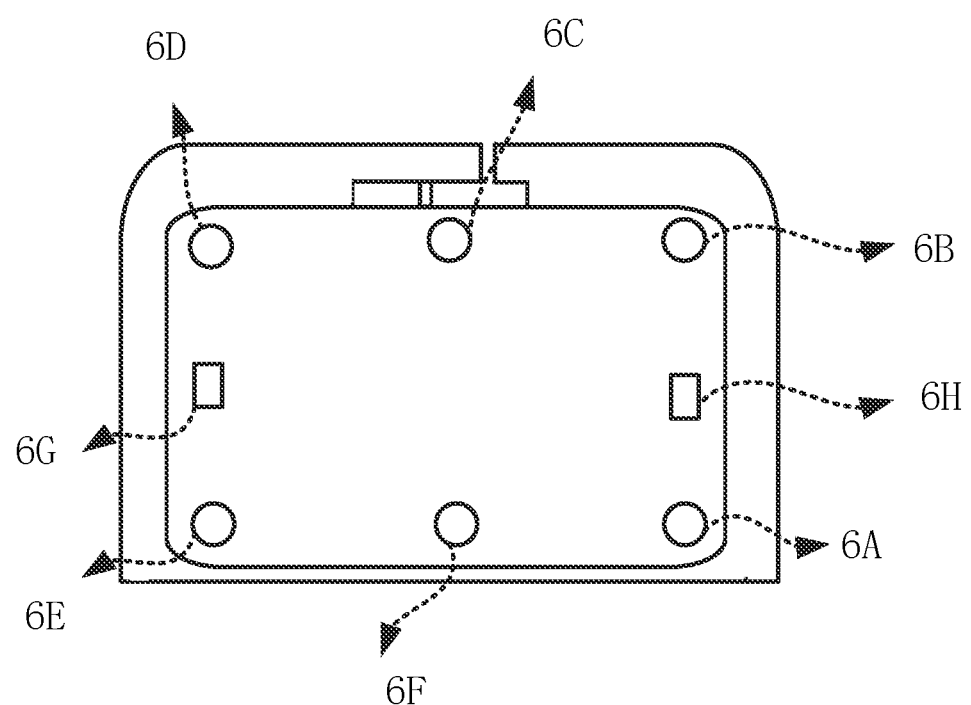
FIG. 9 is another front view illustrating grounding elements of the electronic device shown in FIG. 7.

Based on the antenna structure 200 provided in the present disclosure, the present disclosure also provides an electronic device 300 as shown in FIGS. 7 and 8. The electronic device 300 may include a mainboard 5 and the antenna structure 200 as described in any of the above embodiments. The feed point 1 of the antenna structure 200 may be arranged at the mainboard 5 and connected to the radiator 22 through a metal strip or other conductive structures. As shown in FIG. 9, the electronic device 300 may also include grounding elements 6 that may connect the metal frame and the mainboard 5 to realize grounding and electromagnetic protection. The grounding elements 6 may include grounding screws 6A-6F or metal strips 6G, 6H or other conductive units. The electronic device 300 may include a mobile phone terminal or a tablet terminal, which is not limited in the present disclosure.

Other examples of the present disclosure will be apparent to those skilled in the art from consideration of the specification and practice of the present disclosure. The present disclosure is intended to cover any change, use or adaptation of the present disclosure, which complies with the general principles of the present disclosure and includes common knowledge or conventional technical means in the art that are not disclosed herein. The specification and examples are considered to be merely exemplary, and the true scope of the present disclosure are indicated by the following claims.

It should be understood that the present disclosure is not limited to the specific structures described above and shown in the accompanying drawings, and various modifications and changes may be made without departing from the scope of the present disclosure. The scope of the present disclosure is limited only by the appended claims.

What is claimed is:

1. An antenna structure, comprising:
   a feed point; and
   a metal frame, comprising a body, a radiator and a coupling branch, wherein the radiator and the coupling branch are both connected to the body, and the radiator, the coupling branch and the body enclose a clearance area, wherein a first end of the radiator away from the body and an end of the coupling branch away from the body cooperate to form an antenna gap, and the antenna gap is connected to the clearance area, and wherein the radiator is connected to the feed point;
   wherein the radiator comprises a through groove and an opening, wherein the through groove runs through the radiator along a height direction of the radiator, and the opening is connected to the through groove along a thickness direction of the radiator, and wherein a junction of the feed point and the radiator and the opening are located at both sides of the through groove.

2. The antenna structure according to claim 1, further comprising: a first medium unit arranged in the antenna gap.

3. The antenna structure according to claim 1, further comprising: a second medium unit arranged in the through groove and the opening.

4. The antenna structure according to claim 1, wherein a part of the radiator located on a side of the through groove away from the feed point has a length of greater than or equal to 12.5 mm and less than or equal to 13.5 mm.

5. The antenna structure according to claim 1, wherein a part of the radiator connected to the feed point has a length of greater than or equal to 14 mm and less than or equal to 16 mm.

6. The antenna structure according to claim 1, wherein the antenna gap has a length of greater than or equal to 1 mm and less than or equal to 1.8 mm.

7. The antenna structure according to claim 1, wherein a sum of respective lengths of the radiator, the coupling branch, and the antenna gap is greater than or equal to 17 mm, and less than or equal to 19 mm.

8. The antenna structure according to claim 1, wherein the coupling branch has a length of greater than or equal to 1.5 mm and less than or equal to 2.5 mm.

9. The antenna structure according to claim 1, wherein the opening has a length of greater than or equal to 2 mm and less than or equal to 3 mm.

10. The antenna structure according to claim 1, wherein an interval between the through groove and the antenna gap has a length of greater than or equal to 2 mm and less than or equal to 3 mm.

11. The antenna structure according to claim 1, wherein a distance from a second end of the radiator connected with the body to the feed point is greater than or equal to 10.5 mm and less than or equal to 11.5 mm.

12. The antenna structure according to claim 4, wherein the part of the radiator located on the side of the through groove away from the feed point has a thickness of greater than or equal to 2 mm and less than or equal to 3 mm.

13. The antenna structure according to claim 1, wherein in the thickness direction of the radiator, the through groove has a dimension of greater than or equal to 2 mm and less than or equal to 3 mm.

14. The antenna structure according to claim 5, wherein the part of the radiator connected to the feed point has a thickness of greater than or equal to 2 mm and less than or equal to 3 mm.

15. The antenna structure according to claim 1, wherein the coupling branch has a thickness of greater than or equal to 6 mm and less than or equal to 8 mm.

16. The antenna structure according to claim 4, wherein the part of the radiator located on the side of the through groove away from the feed point has a height of greater than or equal to 2 mm and less than or equal to 3 mm.

17. The antenna structure according to claim 1, wherein the clearance area has a height of greater than or equal to 3 mm and less than or equal to 5 mm.

18. The antenna structure according to claim 1, wherein the radiator is C-shaped.

19. An electronic device, comprising:
a mainboard; and
an antenna structure comprising:
- a feed point arranged at the mainboard; and
- a metal frame, comprising a body, a radiator and a coupling branch, wherein the radiator and the coupling branch are both connected to the body, and the radiator, the coupling branch and the body enclose a clearance area, wherein a first end of the radiator away from the body and an end of the coupling branch away from the body cooperate to form an antenna gap, and the antenna gap is connected to the clearance area, and wherein the radiator is connected to the feed point;
- wherein the radiator comprises a through groove and an opening, wherein the through groove runs through the radiator along a height direction of the radiator, and the opening is connected to the through groove along a thickness direction of the radiator, and wherein a junction of the feed point and the radiator and the opening are located at both sides of the through groove.

20. The electronic device according to claim 19, further comprising a grounding element, wherein the grounding element connects the mainboard and the body.

* * * * *